United States Patent [19]
Hinson

[11] Patent Number: 5,398,905
[45] Date of Patent: Mar. 21, 1995

[54] DIE-CUT DISPLAY BOARD FOR A COMPUTERIZED DISPLAY SCREEN

[76] Inventor: Laurie A. Hinson, 9410 71st Bay South, Cottage Grove, Minn. 55016

[21] Appl. No.: 174,987

[22] Filed: Dec. 29, 1993

[51] Int. Cl.⁶ ............................................ B41J 11/02
[52] U.S. Cl. ............................. 248/442.2; D14/114; 248/918
[58] Field of Search ............... 248/442.2, 444.1, 174, 248/917, 918; D14/114

[56] References Cited

U.S. PATENT DOCUMENTS

| | | | |
|---|---|---|---|
| D. 348,256 | 6/1994 | Basco et al. | D14/114 |
| 1,752,519 | 4/1930 | Cardinet | 248/174 |
| 2,197,806 | 4/1940 | MacDonald | 248/174 X |
| 4,863,242 | 9/1989 | Correa | 350/276 |
| 4,869,565 | 9/1989 | Bachman | 248/918 X |
| 5,104,087 | 4/1992 | Wentzloff et al. | 248/442.2 |
| 5,297,677 | 3/1994 | Burian et al. | 248/174 X |
| 5,328,145 | 7/1994 | Charapich | 248/442.2 |

*Primary Examiner*—Ramon O. Ramirez
*Attorney, Agent, or Firm*—Palmatier, Sjoquist & Helget

[57] ABSTRACT

A die-cut display board for a computerized display screen supported in a housing comprises a thin die-cuttable sheet with a front display face, a back face, a periphery and a central region. Top and side housing tabs are die-cut and scored in the central region of the sheet to permit the tabs to be folded inwardly toward the back side as to lie upon the top and the sides of the housing thereby forming a front opening. The sheet is positioned so that the front opening is substantially in flush alignment with the display screen. Fastening means are provided for affixation of the tabs to the housing.

19 Claims, 2 Drawing Sheets

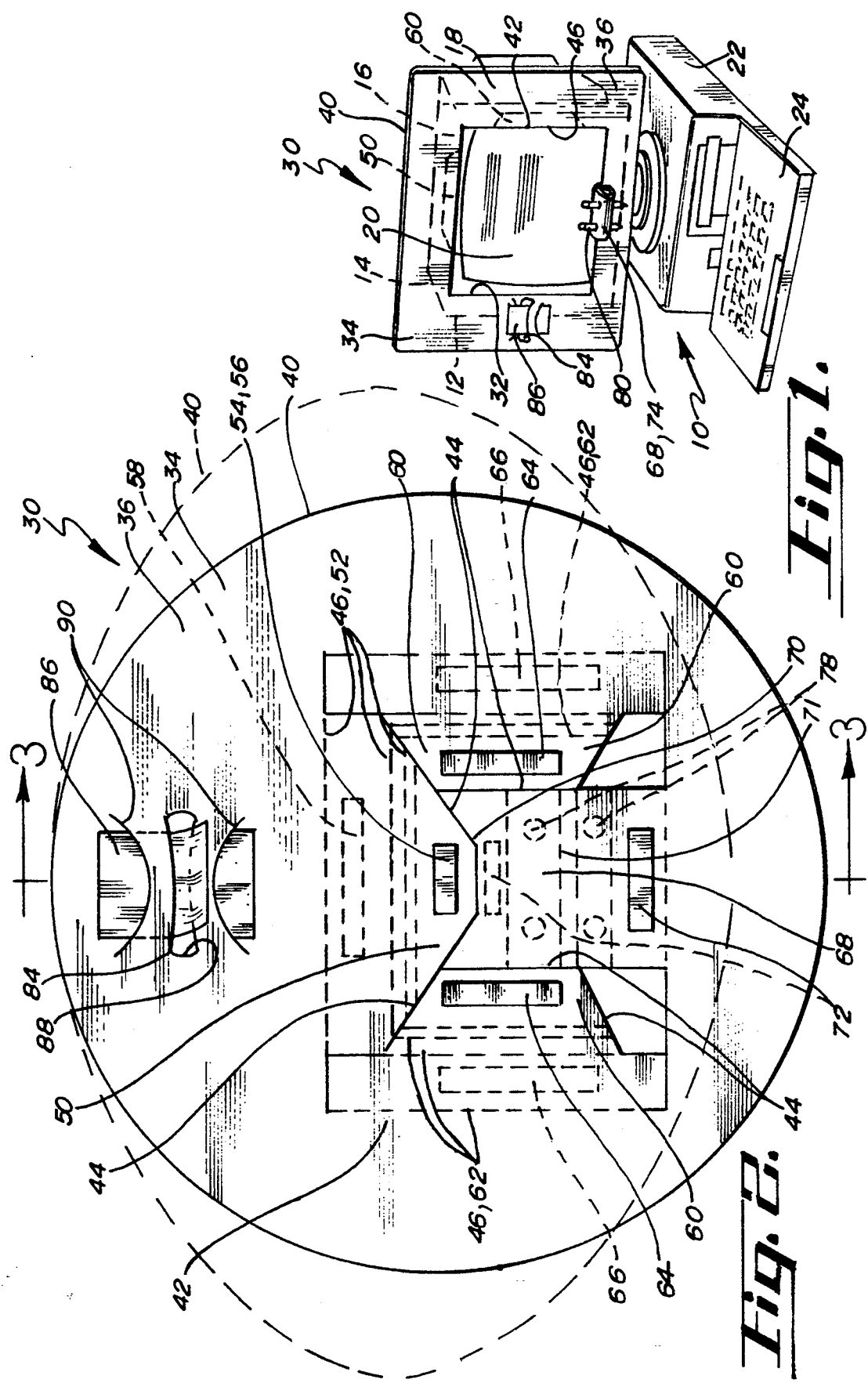

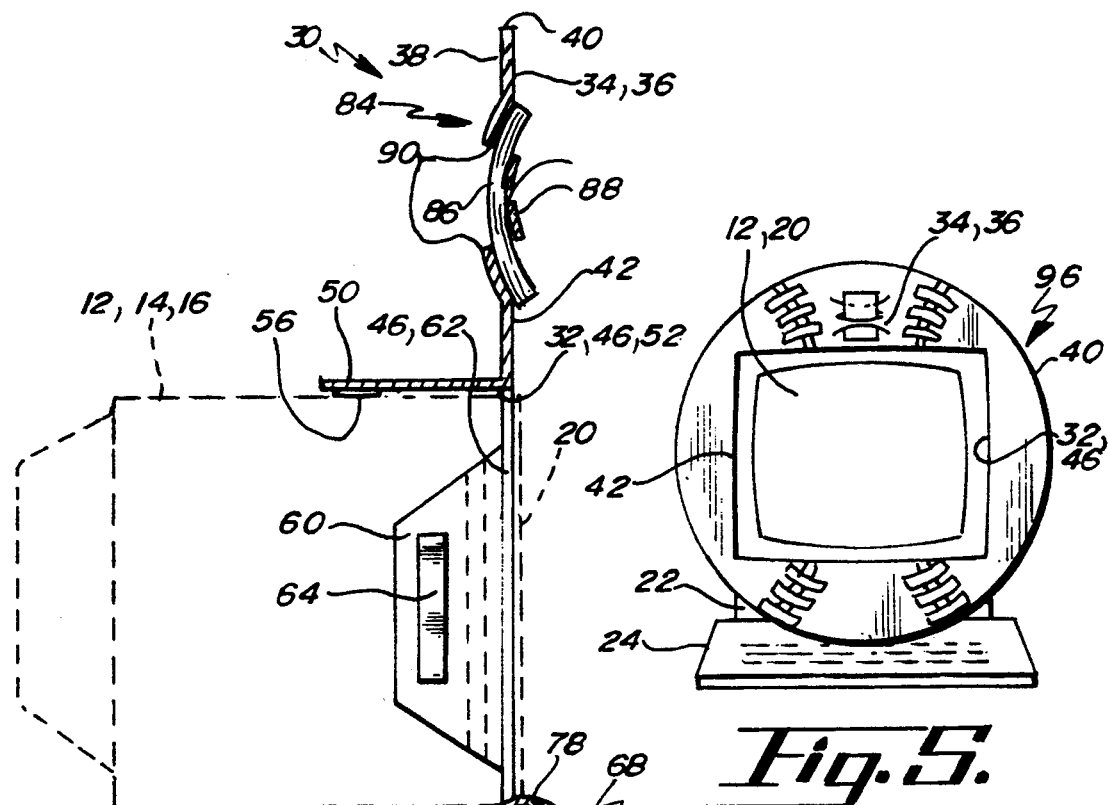
Fig. 3.
Fig. 5.
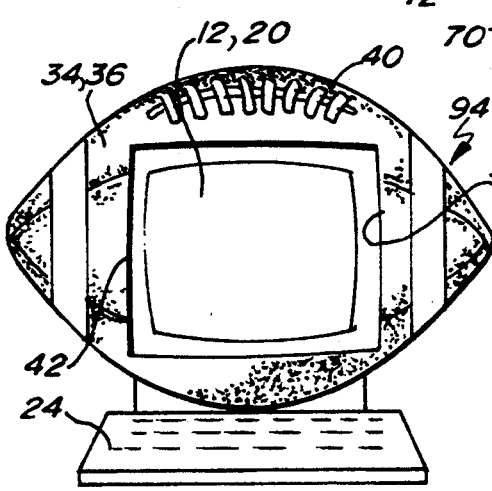
Fig. 4.
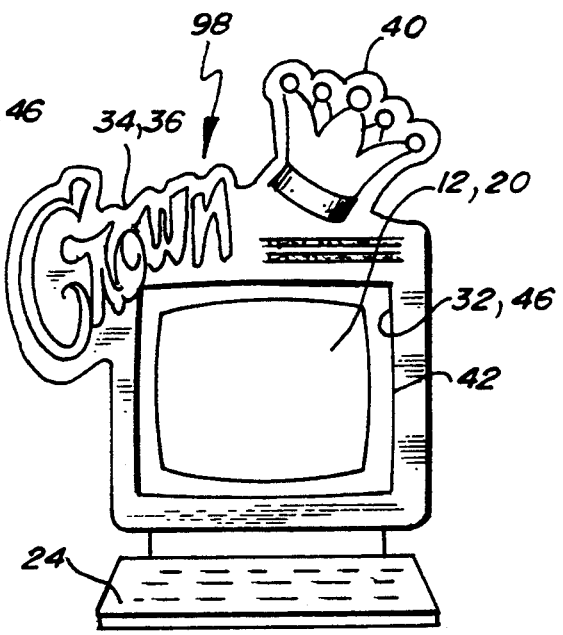
Fig. 6.

DIE-CUT DISPLAY BOARD FOR A COMPUTERIZED DISPLAY SCREEN

BACKGROUND OF THE INVENTION

This invention relates to display boards for computerized display screens and more particularly to a die-cut display board made from a thin sheet fastenable to the screen housing as to position the sheet substantially in flush alignment with the display screen.

Computers are well known and present both in the work place and at home. Computers generally include a display screen, monitor or cathode ray tube that is pleasantly presented commonly in a molded housing. The housing for the display screen may be supported in a variety of ways to include placement on top of a central processing unit (CPU) adjacent the key board.

Computers alone or at a work station often present a relatively sterile environment. That is, the computer hardware has not lent itself for continuous display of various shapes or indicia when the computer is not in use other than that which is displayed on the screen. Also, computers are often located at work stations where a miscellany of writing instruments, note pads, bulletin boards, etc. may be located.

There is a need and a desire for a simple die-cut display board for a computerized display screen that is inexpensive to manufacture and easy to affix to the housing for the display screen. Such a display board should take any of a variety of shapes, display ornamentation and readily support advertising indicia to make the boards attractive and desirable for promoting products and services. Furthermore, such a board should be capable of supporting writing utensils and note pads to render more work space available to the computer operator adjacent their computer.

SUMMARY OF THE INVENTION

A die-cut display board for a computerized display screen supported in a housing comprises a thin die-cuttable sheet with a front display face, a back face, a periphery and a central region. Top and side housing tabs are die-cut and scored in the central region of the sheet to permit the tabs to be folded inwardly toward the back side as to lie upon the top and the sides of the housing thereby forming a front opening. The sheet is positioned so that the front opening is substantially in flush alignment with the display screen. Fastening means are provided for affixation of the tabs to the housing.

A principle object and advantage of the present invention is a thin die-cuttable sheet that is die-cut and scored to create a display board of any of a variety of shapes for both advertising purposes as well as artistic design of the computer work station.

Another object and advantage of the present invention is the capability of the display board to display advertising indicia for promotion of products and services at the work station.

Another object and advantage of the present invention is that the display board is easy to assemble and affix to the housing of the display screen so that the opening of the display board is substantially in flush alignment with the display screen for a unique, aesthetic appearance.

Another object and advantage of the present invention is that the display board has a multiplicity of scored fold lines as to permit the display board to fit various sizes of display screens and housings that are currently and anticipated to be in the work place and at work stations in the home.

Another object and advantage of the present invention is that the display board is extremely inexpensive to manufacture while yet providing a unique opportunity to present any of a variety of shapes, advertising indicia or the like at the computer work station.

Another object and advantage of the present invention is that it supports a memo pad holder at the work station adjacent the display screen to organize and free up more working space at the work station for the operator and to facilitate the ready location of a memo pad.

Another object and advantage of the present invention is that the display board supports a pencil holder to further organize and free up more work space at the work station for the user and to facilitate the ready location of a writing instrument.

Another object and advantage of the present invention is that the display board may display any of a variety of shapes or ornamentations associated with whatever the computer operator finds interesting or attractive.

Other objects and advantages will become readily apparent upon review of the following figures, specification and appended claims.

BRIEF DESCRIPTION OF THE DRAWINGS

FIG. 1 is a perspective view of a computer assembly with the monitor housing in broken outline supporting the display board of the present invention;

FIG. 2 is a plan view of the die-cut sheet of the display board showing two peripheral configurations;

FIG. 3 a cross-sectional view taken along lines 3—3 of FIG. 2 showing the display board mounted on a display screen housing shown in phantom outline;

FIG. 4 is a front elevational view of the display board in the form of a football supported on a computer display screen;

FIG. 5 is a front elevational view of the display board mounted on a display screen housing representing a baseball; and FIG. 6 is a front elevational view of the display board of the present invention mounted on a computer CRT screen housing with a unique peripheral shape and advertising indicia.

DETAILED SPECIFICATION

Referring to FIGS. 1 through 3, the display board 30 of the present invention may be generally seen. A computer or word processor 10 commonly has a display screen 12. The display board 30 is comprised of a die-cut sheet 34 which has top screen housing tab 50 and side screen housing tab 60 suitably affixable to the housing 14 of the display screen 12 appropriately by suitable fastening means 54.

More particularly, computers, word processors, computerized tellers, cash registers and the like 10 commonly include a cathode ray tube (CRT), display screen or monitor 12. Monitor 12 is supported within an aesthetically pleasing box-like housing 14 having a top side or surface 16 and sides 18. On the front portion of housing 14 is located the screen face 20. Monitor 12 is commonly connected to a central processing unit (CPU) 22 which is interactive with the operator by way of a keyboard 24.

The display board 30 of the present invention appropriately has a front opening 32 created by the die-cut action upon a thin die-cuttable sheet 34. Sheet 34 may be cardboard, plastic or some form of laminate which appropriately will accept ornamentation or will provide a writing surface which will easily wipe off. Obverse to display front face or side 36 is a back face or side 38. The display board 30 has a periphery 40 therearound which may take any of a variety of shapes as shown in all the figures. The central region 42 of the sheet 34 appropriately accepts die-cuts 44 and die-scores 46 as is known in the art of printing and preparation of materials from cardboard.

The die-cuts 44 on sheet 34 create a top screen housing tab 50 which suitably has a multiplicity of folding lines 52 thereon created by the multiple die-scores 46. Fastening means 54 suitably may be a double sided adhesive tape 56, VELCRO ® or the like. An optional second double sided adhesive tape portion 58 may also be provided if necessary dependent upon the size of the CRT housing 14 as to secure top tab 50 to top size 16 of housing 14.

Two like side screen housing tabs 60 are also created by the die-cuts 44 and appropriately have folding line 62 created by die-scores 46. Double sided adhesive tape 64 and optional tape 66 may be provided as a fastening means to secure tabs 60 to the sides 18 of housing 14.

Optionally, a bottom pencil holder flap 68 may be appropriately formed by die-cuts 44. The holder flap 68 has an end 70 with double sided adhesive tape fastening means 72. Folding lines 71 are also provided and created by die-scores 46. The folding lines 71 permit the pencil holder flap 68 to take a cylindrical-like pencil or pen holder 74 shape by action of the end 70 with adhesive tape 72 being secured on the back side 38 of the sheet 34 as well as on the front face 36 clearly depicted in FIG. 3. Pencil holder 74 has an inside 76 area and optionally may have top and bottom apertures 78. By this arrangement, pencils 80 may be vertically supported in apertures 78, as shown in FIG. 1, or horizontally supported in the inside 76 of the holder 68, as shown in FIG. 3.

Die-cut sheet 34 may also have a memo pad holder 84 which appropriately will support a memo pad such as a POST-IT ®. Pad 86 appropriately may alternatively have the adhesives on the individual sheets alternatively located on the top and bottom of adjacent pad sheets, as is known, for dispensing sheets out central rectangular dispensing opening 88. As illustrated, upper and lower opposing arcuate die-cut slots 90 permit the pad 86 to be slipped into position and held in position thereat. Individual pad sheets may be pulled out of the dispensing opening 88.

As previously stated, the display board 30 may take any of a variety of peripheral shapes and ornamentations, including advertisements. Specifically, FIG. 4 shows a football shaped board; FIG. 5 shows a baseball shaped board 96; and FIG. 6 shows a billboard advertising indicia board 98.

The manufacturer of the display board 36 may now be appreciated. A die-cut sheet 34 may receive printing thereon. Thereafter, sheet 34 appropriately has its desired periphery 40 cut suitably at the same time die-cuts 44 and die-scores 46 are made. Thereafter, the die-cut sheet 34, which forms display board 30, may be packaged for shipping and sale.

In operation, the computer operator may remove the display board 30 from the packaging and break free the tabs 50 and 60 that are created by die-cuts 44. Depending upon the display screen housing 14 size, the folding lines 52 and 62 of tabs 50 and 60 may be selected for appropriately folding the tabs 50 and 60 inwardly toward the back face or side 38 as to lie upon the top 16 and sides 18 of the housing 14 to thereby create front opening 32 which is suitably substantially in flush alignment with display screen face 20. The optional bottom pencil holder flap 68 may also be folded to create the cylindrical-like pencil holder 74 and secured thereat by adhesive means 72. The optional memo pad 84 may have the pad 86 appropriately positioned and held by die-cut slots 90 with the first sheet extending through the dispensing opening 88.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A die-cut display board for a computerized display screen supported in a housing with a top and two sides, the display board comprising:
   (a) a thin, die-cuttable sheet with a front display face, a back face, a periphery and a central region;
   (b) a top and two side housing tabs die-cut in the central region of the sheet, the tabs being scored to form multiple fold lines to permit the tabs to be folded inwardly toward the back side as to lie upon the top and the sides of the housing and forming a front opening whereat the sheet is positioned for substantially flush alignment with the display screen; and
   (c) fastening means on the front face of the tabs for securement of the tabs to the housing, wherein said multiple fold lines in each tab permit the display board to fit various sizes of display screens and housings.

2. The die-cut display board of claim 1, further comprising a die-cut rectangular dispensing opening in the sheet and two opposing arcuate die-cut slots in the sheet, one on each side of the rectangular dispensing opening forming a memo pad holder.

3. The die-cut display board of claim 1, wherein the fastening means is double-sided adhesive tape.

4. The die-cut display board of claim 1, wherein the periphery and the front display face are adapted to display an ornamental shape and indicia.

5. The die-cut display board of claim 1, further comprising a bottom pencil holder flap die-cut in the central region and scored to form fold lines to permit the flap to be folded outwardly toward the front display face to form a cylindrical-like pencil holder fastened to the front display face.

6. The die-cut display board of claim 5, further comprising pencil apertures in the pencil holder to vertically support a pencil.

7. A die-cut display board for a computerized display screen supported in a housing with a top and two sides, the display board comprising:
   (a) a thin, die-cuttable sheet with a front display face, a back face, a periphery and a central region;
   (b) a top and two side housing tabs die-cut in the central region of the sheet, the tabs being scored to form fold lines to permit the tabs to be folded inwardly toward the back side as to lie upon the top and the sides of the housing and forming a front opening whereat the sheet is positioned for substantially flush alignment with the display screen;

(c) a bottom pencil holder flap die-cut in the central region and scored to form fold lines to permit the flap to be folded outwardly toward the front display face to form a cylindrical-like pencil holder fastened to the front display face;

(d) fastening means on the front face of the tabs for securement of the tabs to the housing; and (e) a die-cut rectangular dispensing opening in the sheet and two opposing arcuate die-cut slots in the sheet, one on each side of the rectangular dispensing opening forming a memo pad holder.

8. A die-cut display board for a computerized display screen supported in a housing with a top and two sides, the display board comprising:

(a) a thin, die-cuttable sheet with a front display face, a back face, a periphery and a central region;

(b) a top and two side housing tabs die-cut in the central region of the sheet, the tabs being scored to form fold lines to permit the tabs to be folded inwardly toward the back side as to lie upon the top and the sides of the housing and forming a front opening whereat the sheet is positioned for substantially flush alignment with the display screen;

(c) a bottom pencil holder flap die-cut in the central region and scored to form fold lines to permit the flap to be folded outwardly toward the front display face to form a cylindrical-like pencil holder fastened to the front display face, wherein a pencil may be supported horizontally and vertically; and (d) fastening means on the front face of the tabs for securement of the tabs to the housing.

9. The die-cut display board of claim 8, wherein the fastening means is double-sided adhesive tape.

10. The die-cut display board of claim 8, wherein the periphery and the front display face are adapted to display an ornamental shape and indicia.

11. The die-cut display board of claim 8, further comprising pencil apertures in the pencil holder to vertically support a pencil.

12. The die-cut display board of claim 8, further comprising a die-cut rectangular dispensing opening in the sheet and two opposing arcuate die-cut slots in the sheet, one on each side of the rectangular dispensing opening forming a memo pad holder.

13. The die-cut display board of claim 8, further comprising multiple fold lines in each tab to permit the display board to fit various sizes of display screens and housings.

14. A die-cut display board for a computerized display screen supported in a housing with a top and two sides, the display board comprising:

(a) a thin, die-cuttable sheet with a front display face, a back face, a periphery and a central region;

(b) a top and two side housing tabs die-cut in the central region of the sheet, the tabs being scored to form fold lines to permit the tabs to be folded inwardly toward the back side as to lie upon the top and the sides of the housing and forming a front opening whereat the sheet is positioned for substantially flush alignment with the display screen;

(c) a die-cut rectangular dispensing opening in the sheet and two opposing arcuate die-cut slots in the sheet, one on each side of the rectangular dispensing opening forming a memo pad holder; and (d) fastening means on the front face of the tabs for securement of the tabs to the housing.

15. The die-cut display board of claim 14, further comprising multiple fold lines in each tab to permit the display board to fit various sizes of display screens and housings.

16. The die-cut display board of claim 14, wherein the fastening means is double-sided adhesive tape.

17. The die-cut display board of claim 14, wherein the periphery and the front display face are adapted to display an ornamental shape and indicia.

18. The die-cut display board of claim 14, further comprising a bottom pencil holder flap die-cut in the central region and scored to form fold lines to permit the flap to be folded outwardly toward the front display face to form a cylindrical-like pencil holder fastened to the front display face.

19. The die-cut display board of claim 18, further comprising pencil apertures in the pencil holder to vertically support a pencil.

* * * * *